US006694662B1

(12) United States Patent
McClure

(10) Patent No.: US 6,694,662 B1
(45) Date of Patent: Feb. 24, 2004

(54) ICE-SKIMMING DEVICE

(76) Inventor: Jeffery McClure, 1509 Keystone, Brandon, SD (US) 57005

( * ) Notice: Subject to any disclaimer, the term of this patent is extended or adjusted under 35 U.S.C. 154(b) by 0 days.

(21) Appl. No.: 10/162,544

(22) Filed: Jun. 3, 2002

(51) Int. Cl.[7] .............................................. A01K 97/00
(52) U.S. Cl. ...................................................... 43/4
(58) Field of Search .................. 43/4, 21.2; 137/527.6, 137/527

(56) References Cited

U.S. PATENT DOCUMENTS

| 891,012 | A | * | 6/1908 | Shepard | 210/131 |
|---|---|---|---|---|---|
| 2,799,146 | A | | 7/1957 | Meagher | |
| 2,877,595 | A | | 3/1959 | Stewart | |
| 2,927,596 | A | * | 3/1960 | Carlson | 137/146 |
| 3,056,272 | A | | 10/1962 | Eilers | |
| 3,059,451 | A | | 10/1962 | Anderson | |
| 3,722,940 | A | * | 3/1973 | Misjak | 294/1.1 |
| 3,747,253 | A | * | 7/1973 | Gangi et al. | 43/4 |
| 4,114,304 | A | * | 9/1978 | Hedlund | 126/360.1 |
| 4,718,188 | A | | 1/1988 | Roberts | |
| 4,978,156 | A | * | 12/1990 | Marhula | 294/1.1 |
| 5,048,220 | A | * | 9/1991 | Harris | 43/4 |
| 5,072,538 | A | * | 12/1991 | Hendricks et al. | 43/4 |

FOREIGN PATENT DOCUMENTS

| CA | 453511 | | 4/1986 | |
| CA | 1203200 A | * | 4/1986 | B07B/1/00 |

* cited by examiner

Primary Examiner—Charles T. Jordan
Assistant Examiner—Susan C. Alimenti
(74) Attorney, Agent, or Firm—Koeller Law Office; Gregory L. Koeller

(57) ABSTRACT

An ice-skimming device for removing ice particles from an ice-fishing hole. The ice-skimming device includes a housing for capturing the ice particles floating in an ice-fishing hole. The present invention also has a handle for carrying and operating the present invention. A filtering assembly is pivotally coupled to the inner surface of the housing for filtering out the ice particles from the water. The filtering assembly is selectively abuttable against a lip portion extending away from the inner surface for supporting the filtering assembly.

14 Claims, 7 Drawing Sheets

ICE-SKIMMING DEVICE

BACKGROUND OF THE INVENTION

1. Field of the Invention

The present invention relates to ice skimmers and more particularly pertains to a new ice-skimming device for removing ice particles from an ice-fishing hole.

2. Description of the Prior Art

The use of ice skimmers is known in the prior art. More specifically, ice skimmers heretofore devised and utilized are known to consist basically of familiar, expected and obvious structural configurations, notwithstanding the myriad of designs encompassed by the crowded prior art, which have been developed for the fulfillment of countless objectives and requirements.

Known prior art includes U.S. Pat. No. 4,718,188; U.S. Pat. No. 3,747,253; U.S. Pat. No. 3,722,940; U.S. Pat. No. 2,877,595; U.S. Pat. No. 5,048,220; U.S. Pat. No. 3,056,272; U.S. Pat. No. 3,059,451; U.S. Pat. No. 2,799,146 and Canadian Patent No. 453,511.

While these devices fulfill their respective, particular objectives and requirements, the aforementioned patents do not disclose a new ice-skimming device. Conventional ice-skimming devices typically employ a generally flat or bowl shaped strainer mounted on an end of an elongate handle. Although these conventional devices were useful for their intended purpose, they required a user to spend considerable time repeatedly scooping out the ice particles from the ice-fishing hole.

Another conventional device is Canadian Patent No. 453,511, which employs a tubular member and a perforated member pivotally coupled thereto. The device also employs a flexible rod positioned in a housing to effectuate movement of the perforated member with respect to the tubular member. Although the device is useful for its intended purpose, it requires both hands of a user in its operation. Additionally, water trapped between the flexible rod and the housing may become frozen preventing the device from being used.

SUMMARY OF THE INVENTION

The general purpose of the present invention, which will be described subsequently in greater detail, is to provide a new ice-skimming device which has many of the advantages of the ice skimmers mentioned heretofore and many novel features that result in a new ice-skimming device which is not anticipated, rendered obvious, suggested, or even implied by any of the prior art ice skimmers, either alone or in any combination thereof. The inventive device includes a housing for capturing the ice particles floating in an ice-fishing hole. Unlike the Canadian patent, the housing of the present invention has a lip portion extending away from an inner surface of the housing defining the bore.

The present invention also has a handle having first and second ends pivotally mounted to a first end of the housing for carrying and operating the present invention. The present invention also has a filtering assembly that is pivotally coupled to the inner surface of the housing and selectively abuttable against the lip portion for filtering out the ice particles from the water. The lip portion of the housing supports the filtering assembly permitting large amounts of ice particles to be removed from one or a plurality of ice fishing holes.

There has thus been outlined, rather broadly, the more important features of the ice-skimming device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new ice-skimming device which has many of the advantages of the ice skimmers mentioned heretofore and many novel features that result in a new ice-skimming device which is not anticipated, rendered obvious, suggested, or even implied by any of the prior art ice skimmers, either alone or in any combination thereof.

Still another object of the present invention is to provide a new ice-skimming device for removing ice particles from an ice fishing hole. The new ice-skimming device may be used to remove ice particles from a plurality of ice fishing holes without the need for repeatedly emptying the device.

Still yet another object of the present invention is to provide a new ice-skimming device that a user can operate by one hand.

Even still another object of the present invention is to provide a new ice-skimming device that will not become inoperable due to freezing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
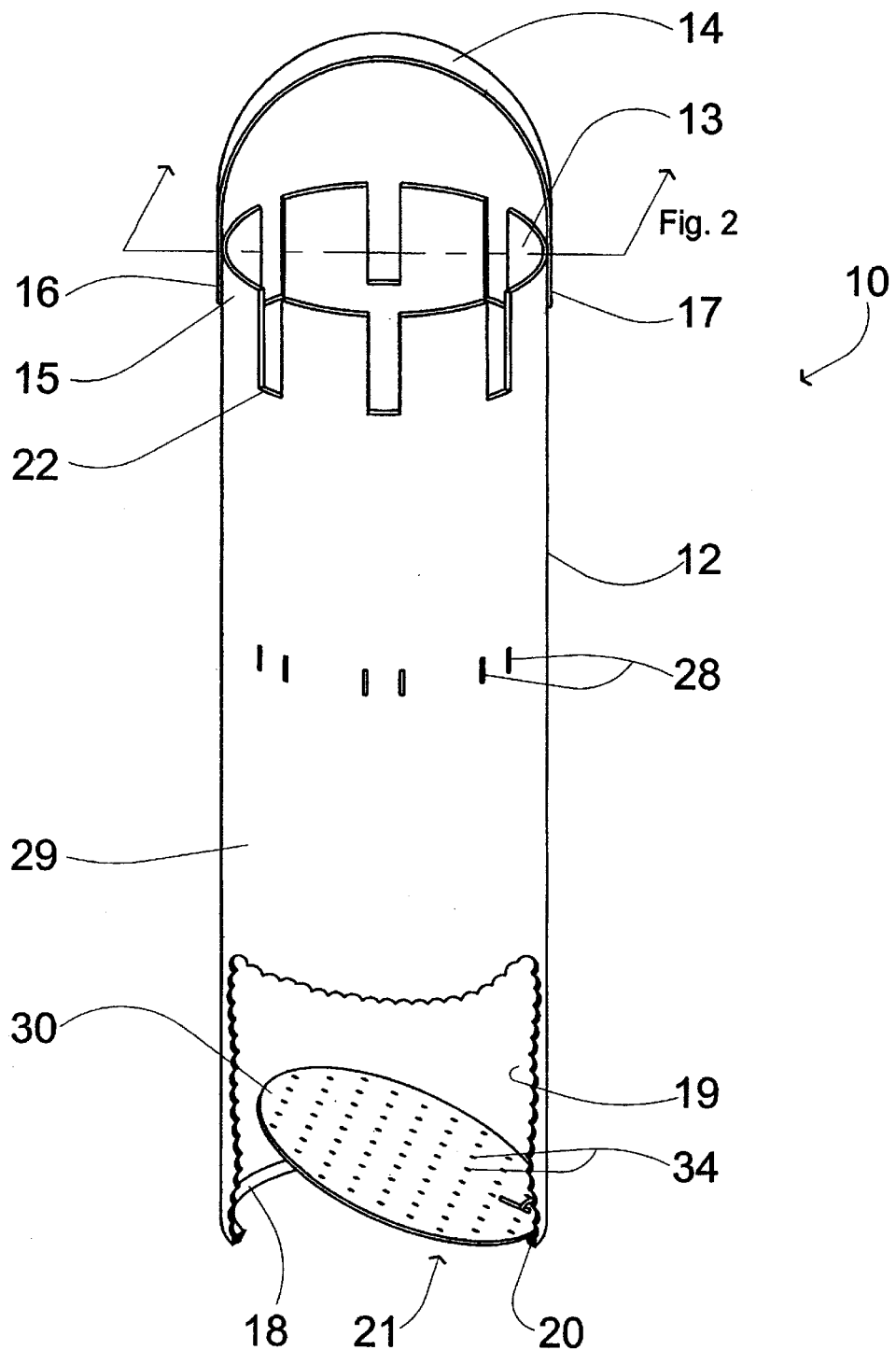
FIG. 1 is a perspective view of a new ice-skimming device according to the present invention.

With reference now to the drawings, and in particular to FIGS. 1 through 7 thereof, a new ice-skimming device embodying the principles and concepts of the present invention and generally designated by the reference numeral 10 will be described.

As best illustrated in FIGS. 1 through 7, the ice-skimming device 10 generally comprises a housing 12 that has a bore 13 extending axially through open first 15 and second 20 ends. The housing 12 is for receiving and holding ice particles removed from a drilled ice-fishing hole. As illustrated in FIG. 1, a handle 14 is mounted to the housing 12 adjacent the open first end 15 of the housing 12 for permitting a user to hold and carry the housing 12. As is also illustrated in FIG. 1, a filtering assembly 21 for filtering ice particles out of the ice-fishing hole is mounted in the bore 13 of the housing 12 and is positioned generally adjacent to the open second end 20 of the housing 12.

The handle 14 includes a first end 16 and a second end 17 mounted to an outer surface of the housing 12. In one embodiment of the present invention, the first 16 and second 17 ends of the handle 14 may be pivotally coupled to an outer surface of the housing 12 for more easily permitting a user to empty the housing 12.

As illustrated in FIG. 1, the housing 12 preferably has a lip portion 18 that extends away from an inner surface 19 of the housing 12. The lip portion 18 is positioned generally adjacent to the open second end 20 of the housing 12 and may extend about an inner circumference of the housing 12.

The filtering assembly 21 is preferably pivotally coupled to the inner surface 19 of the housing 12 and is selectively abuttable against an upper surface of the lip portion 18. The lip portion 18 provides support to the filtering assembly 21 permitting a user to remove a large amount of ice particles from the ice-fishing hole.

In one embodiment of the present invention the housing 12 may have a generally circular transverse cross section taken substantially perpendicular to a longitudinal axis of the housing 12. However, one skilled in the art would appreciate that the housing 12 may employ a variety of transverse cross sectional shapes.

The housing 12 may comprise a generally flexible material such as, for example, a plastic. The flexible characteristics of the material will permit the housing 12 to conform to the shape of an ice-fishing hole. It should be appreciated that the housing 12 may also comprise of other materials such as, for example, a metal material. The housing 12 may also be manufactured in various sizes and lengths to accommodate ice-fishing holes of various diameters.

Figure 2:
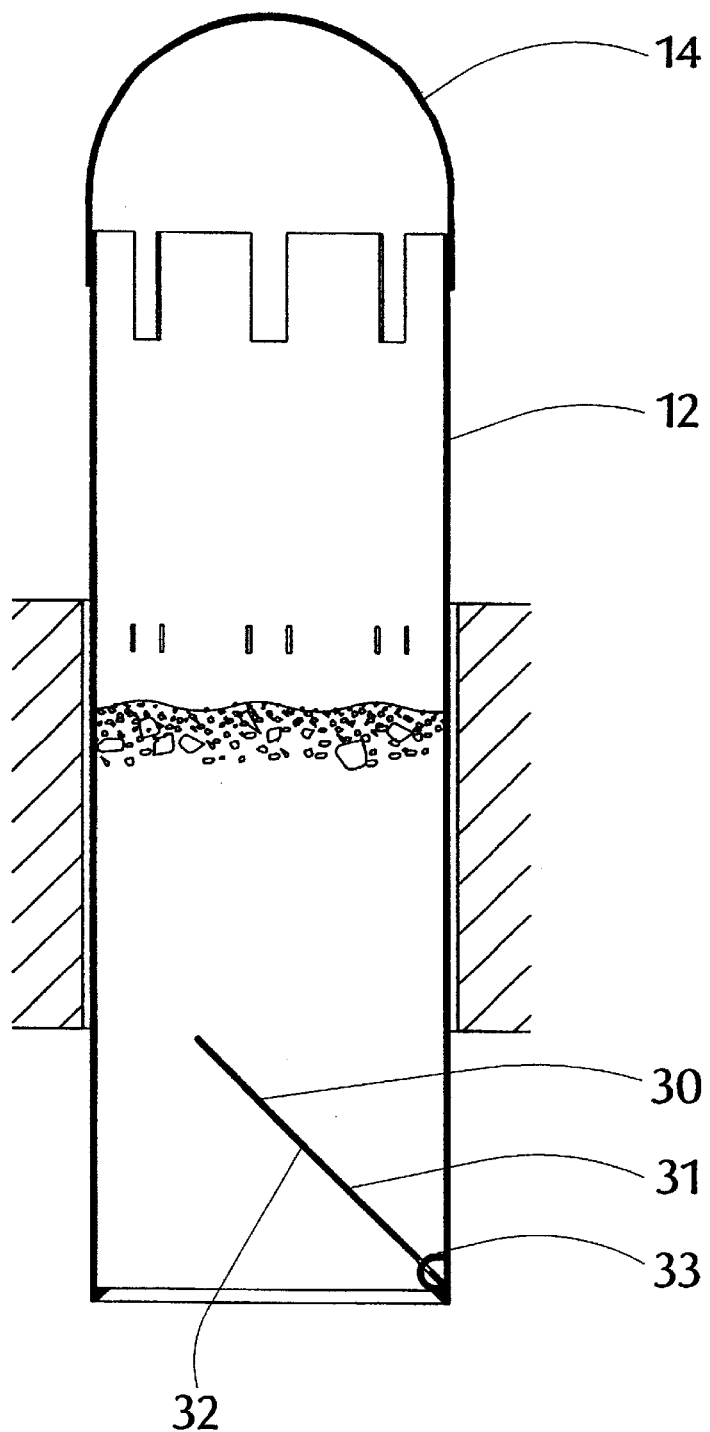
FIG. 2 is a cross sectional view of the present invention taken along line 2—2 of FIG. 1.

In the first of several embodiments and as illustrated in FIGS. 1 and 2, the filtering assembly 21 may include a plate 30 that has first 31 and second 32 opposed surfaces. The plate 30 also has a plurality of spaced holes 34 for permitting water to pass through the plate 30. The plate 30 preferably has a diameter slightly smaller than a diameter of the housing for permitting free movement of the plate 30 between an open and closed position.

The open position is characterized by the plate 30 being orientated generally parallel to a longitudinal axis of the housing 12 such that the open first end 20 of the housing 12 is in communication with the bore 13. The closed position is characterized by the plate 30 being orientated perpendicular to the longitudinal axis of the housing 12 such that the open first end 20 of the housing 12 is blocked.

A means of pivotally coupling 33 the plate 30 to the inner surface 19 of the housing 12 may be provided, whereby the plate 30 is pivotally positionable between the open position and closed positions. The means of pivotally coupling 33 the plate 30 to the inner surface 19 of the housing 12 may comprise an arcuate member mounted to the inner surface 19 of the housing 12 and which extends through a portion of the plate 30 adjacent to a peripheral edge of the plate 30. However, one skilled in the art may employ various fasteners and hinges to pivotally couple the plate 30 to the housing 12.

Figure 3:
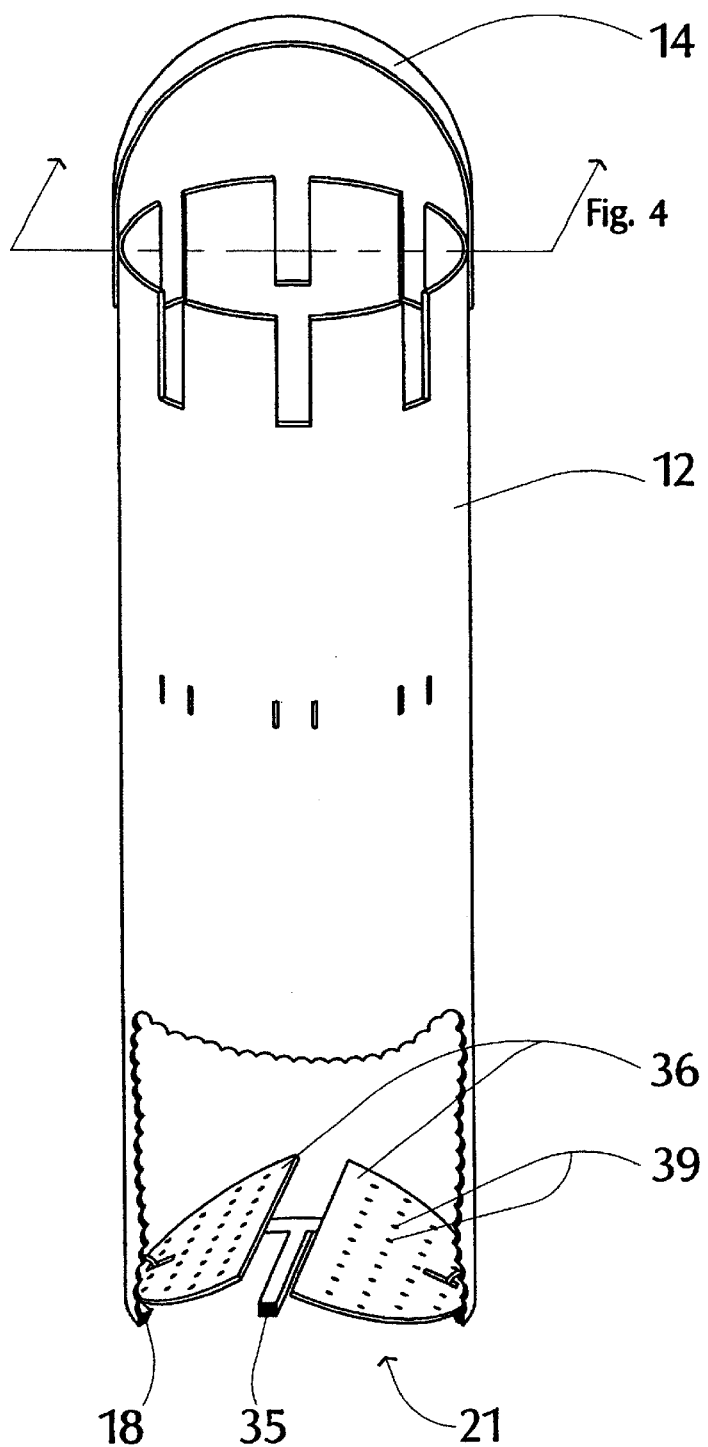
FIG. 3 is a perspective view of another embodiment of the present invention.
Figure 4:
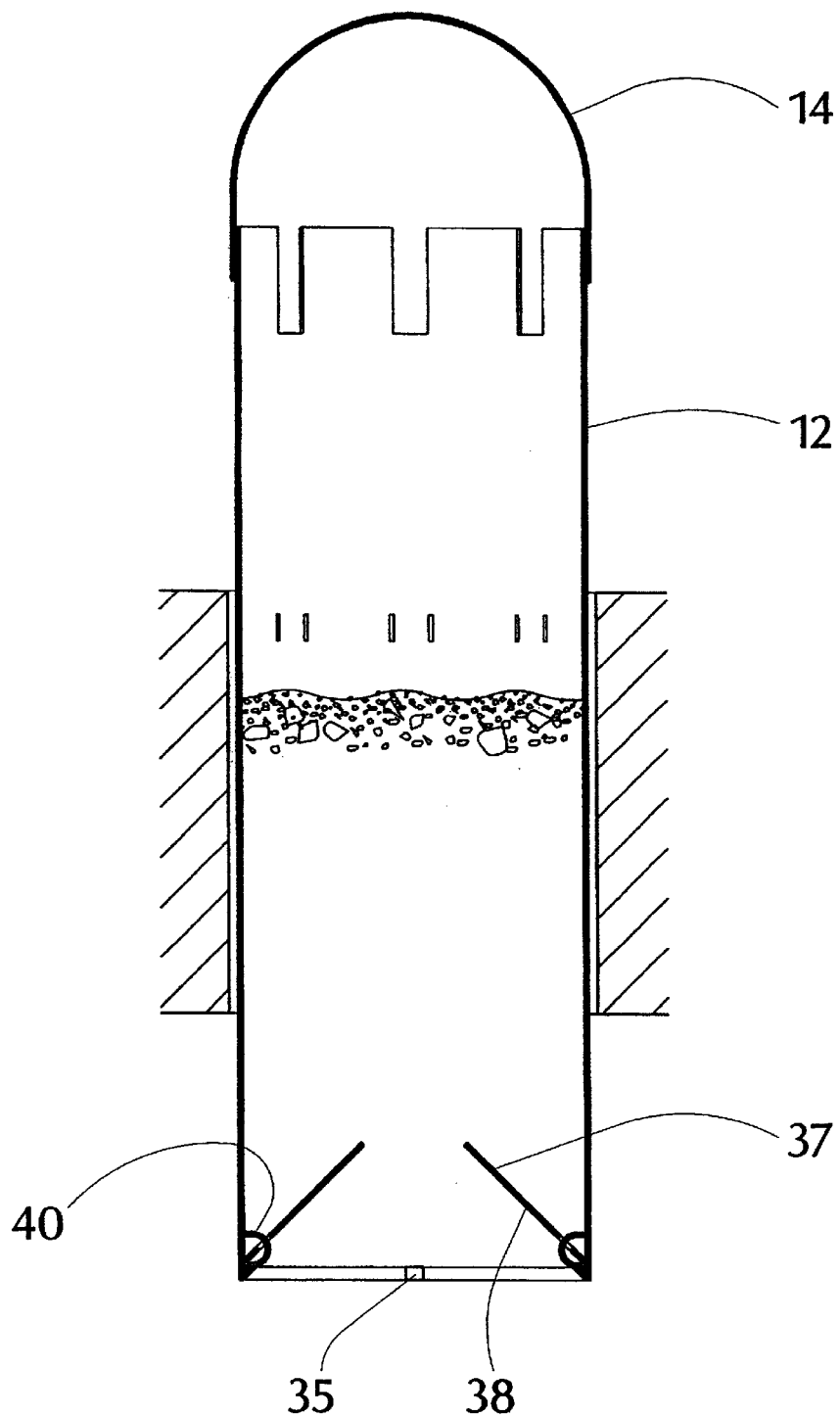
FIG. 4 is a cross sectional view of the present invention taken along line 4—4 of FIG. 3.

In a second embodiment of the present invention, as particularly illustrated in FIGS. 3 and 4, a cross support 35 may be coupled to the lip portion 18 and may extend across the open second end 20 of the housing. The filtering assembly 21 may include at least a pair of plates 36 that pivot away from each other in the open position and generally toward each other in the closed position.

Similar to the first embodiment, each of the plates 36 has first 37 and second 38 opposed surfaces having a plurality of spaced holes 39 extending therethrough for permitting water to pass through. Additionally, a means of pivotally coupling 40 each of the plates 36 to the inner surface 19 of the housing 12 may also be provided.

In the second embodiment of the present invention, each of the plates 36 of the filtering assembly 21 is pivotally coupled to the inner surface 19 of the housing 12 and is selectively abuttable against the lip portion 18 and the cross support 35.

In the second embodiment of the present invention the means of pivotally coupling 40 the at least one pair of plates 36 to the inner surface 19 of the housing 12 may comprises a pair of arcuate members mounted to the inner surface 19 of the housing 12 and may extend through a portion of each of the at least one pair of plates 36. The pair of arcuate members is preferably diametrically opposed to each other preventing interference between the at least one pair of plates 36 moving between the open and closed positions.

Figure 5:
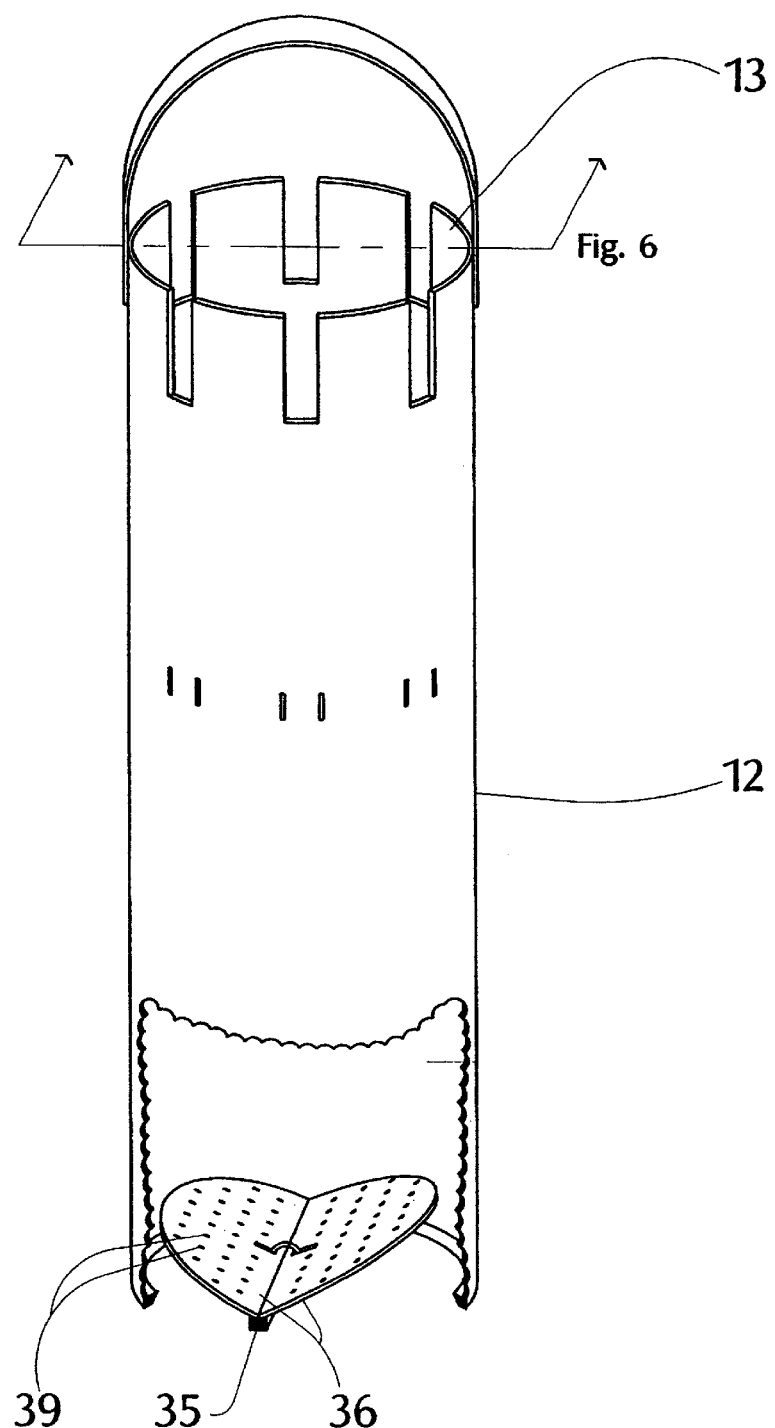
FIG. 5 is a perspective view of another embodiment of the present invention.
Figure 6:
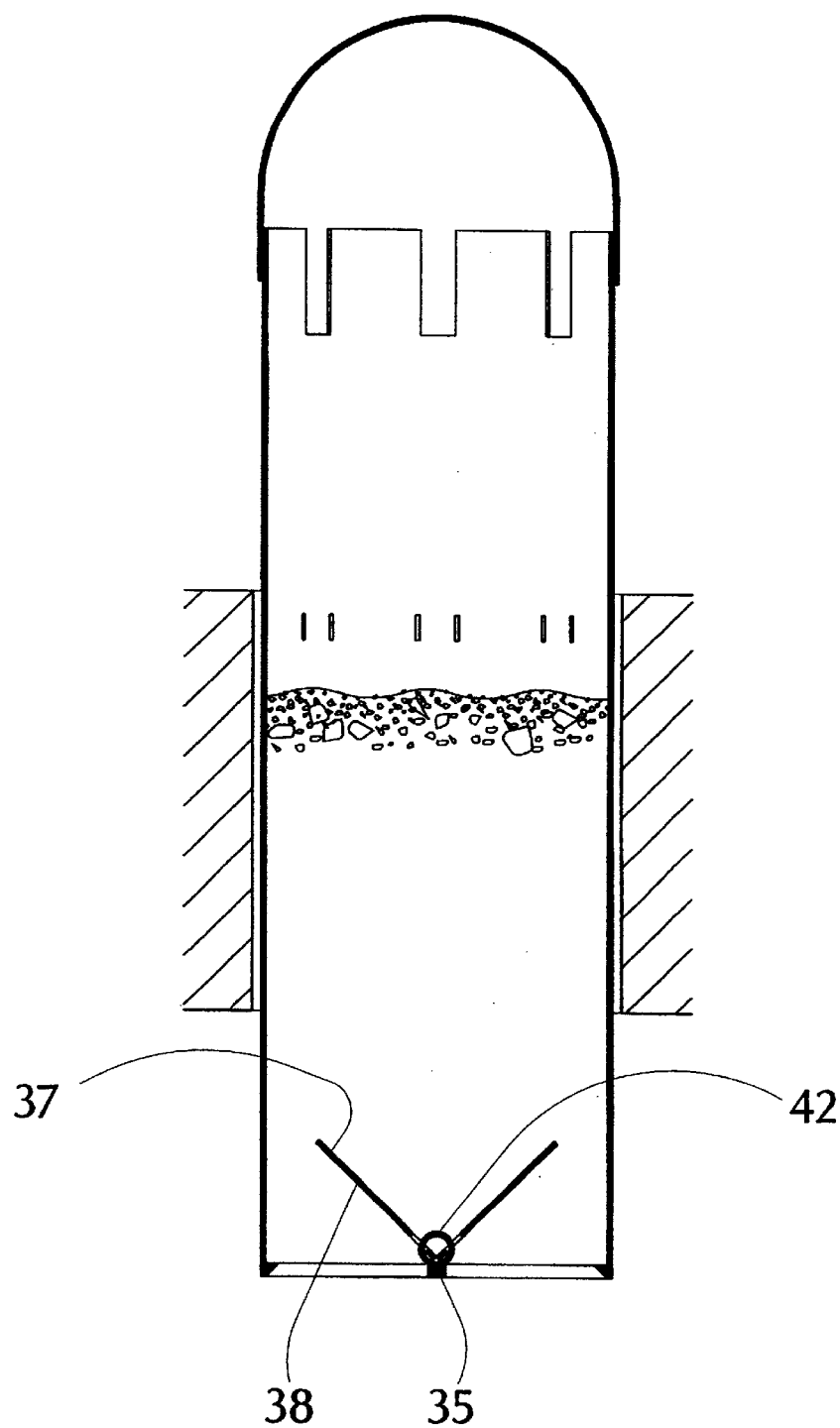
FIG. 6 is a cross sectional view of the present invention taken along line 6—6 of FIG. 5.

In a third embodiment of the present invention, as particularly illustrated in FIGS. 5 and 6, the at least pair of plates 36 of the filtering assembly 21 is pivotally coupled to the cross support 35 and selectively abuttable against the lip portion 18 and the cross support 35 for filtering out the ice particles from the water.

A means of pivotally coupling 42 each of the plates 36 to the cross support 35 may be coupled to the cross support 35 and extends through a portion of each of the pair of plates 36. The means of pivotally coupling 42 the at least one pair of plates 36 to the cross support 35 may comprise an annular member mounted to the cross support 35 and positioned generally on a central portion thereof.

Figure 7:
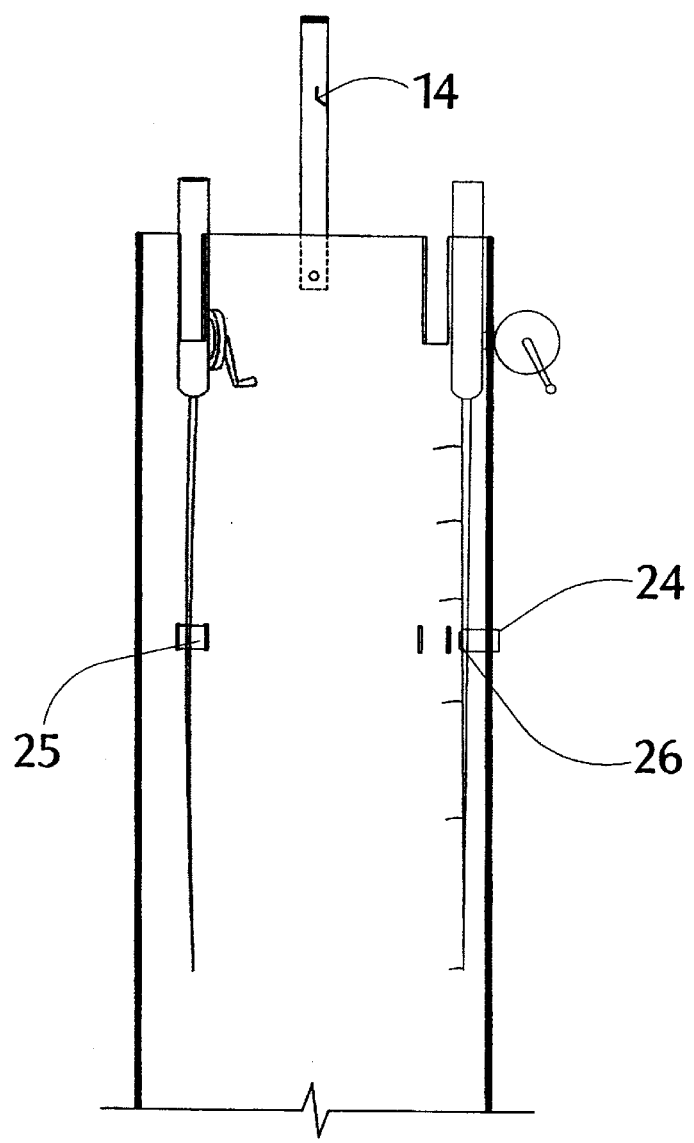
FIG. 7 is a cross sectional view of the present invention.

In addition to removing ice particles from an ice-fishing hole, the present invention may also be used to carry assorted ice-fishing gear such as, for example, fishing poles. As illustrated in FIG. 1, at least one notch 22 may extend generally from an edge of the housing 12 toward the open second end 20 the housing 12. As illustrated in FIG. 7, a user may removably position the fishing pole in the bore 13 and support a reel of the fishing pole in the at least one notch 22. As particularly illustrated in FIG. 1, one skilled in the art would appreciate that a plurality of spaced notches may be positioned about a circumference of the housing 12 for receiving a plurality of fishing poles.

Additionally, as illustrated in FIG. 7, at least one securing member 24 may be mounted to the housing 12, whereby a user may removably position the securing member 24 around the rod of the fishing pole in the bore 13. The securing member 24 prevents movement of the fishing pole in the bore 13 of the housing 12.

In one embodiment of the present invention the at least one securing member 24 has first 25 and second 26 ends.

The first 25 and second 26 ends of the at least one securing member 24 may be extendable through a pair of spaced holes 28 extending through the housing 12, whereby a user may position the first 25 and second 26 ends of the at least securing member 24 removably around a portion of the rod of the fishing pole. The at least one securing member 24 may comprise a flexible strip. The strip may include a first surface having a plurality of hooks and second surface having a plurality of loops, whereby the plurality of hooks and loops are releaseably couplable.

In use, a user employs an ice drill to drill an ice-fishing hole into the ice. The drill leaves a plurality of ice particles in the ice fishing hole, which can refreeze making the hole unusable. Therefore, a user must remove the plurality of ice particles.

A user removes the ice particles by holding onto the handle 14 of the present invention and extending the open second end 20 of the housing 12 into the ice-fishing hole. In the first embodiment, the plurality of ice particles and water forces the plate 30 from the closed position toward the open position. In the open position, the water and ice particles enter the bore 13 of the housing 12. Once the ice particles are in the bore 13 of the housing 12, the user can then remove the housing 12 from the ice-fishing hole.

When a user removes the housing 12 from the ice-fishing hole the water in the bore 13 of the housing 12 causes plate 30 to move from the open position to the closed position. The density of the ice causes it to float on the surface of the water and therefore becomes blocked when the plate 30 is in the closed position. Any water remaining in the bore 13 of the housing 12 escapes through the plurality of holes 39 in the plate.

In the second embodiment, each of the plates 36 move away from each other and away from the cross support 35 when the housing 12 is inserted into the ice-fishing hole. This open position permits the ice particles to enter the bore 13 of the housing 12. When the housing 12 is removed from the ice-fishing hole the pair of plates 36 move toward each other and selective abut the cross support 35 blocking the ice particles in the bore 13 of the housing 12.

In the third embodiment, each of the plates 36 move toward each other and away from the inner surface 19 of the housing 12 when the housing 12 is inserted into an ice-fishing hole. This open position permits the ice particles to enter the bore 13 of the housing 12. When the housing 12 is removed from the ice-fishing hole the pair of plates move away from each other and selectively abut the lip portion 18 extending away from the inner surface 19 of the housing 12.

Since the ice particles float a user may remove the ice particles from a plurality of ice-fishing holes before emptying the housing 12. To remove the ice particles from the housing 12, a user needs grasps the open second end 20 of the housing 12 and empties the ice out the open first end 15 of the housing 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the ice-skimming device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An ice-skimming device for removing ice particles from an ice fishing hole, said device also being adapted for holding at least one fishing pole, said device comprising:
   a housing having a bore for holding the ice particles, said housing having open first and second ends, said housing having a lip portion extending away from an inner surface of said housing defining said bore, wherein said lip portion extends about an inner circumference of said housing and is positioned generally adjacent to said open second end of said housing;
   a handle having first and second ends pivotally coupled to a portion of said housing; and
   a filtering assembly being pivotally coupled to said inner surface of said housing and selectively abuttable against said lip portion for filtering out the ice particles from the water.

2. The ice-skimming device of claim 1, additionally includes;
   a cross support being coupled to said lip portion and extending across said open second end of said housing; and
   said filtering assembly being pivotally coupled to said inner surface of said housing and selectively abuttable against said lip portion and said cross support for filtering out the ice particles from the water.

3. The ice-skimming device of claim 2, wherein said first end of said housing has at least one notch extending generally from an edge of said housing toward said second end of said housing, wherein a user may removably position the fishing pole in said bore and supporting a handle of the fishing pole in said at least one notch.

4. The ice-skimming device of claim 3, wherein said at least one notch includes a plurality of spaced notches positioned about a circumference of said housing.

5. The ice-skimming device of claim 2, additionally including at least one securing member being mounted to said housing and extendable around the fishing pole for removably securing the fishing pole in said bore.

6. The ice-skimming device of claim 5, wherein said at least one securing member has first and second ends, said first and second ends being extendable through a pair of spaced holes extending through a peripheral wall of said housing, wherein said first and second ends of said at least securing member being removably securable around a portion of the fishing pole.

7. The ice-skimming device of claim 2, wherein said filtering assembly includes:
   at least a pair of plates, each of said plates having first and second opposed surfaces, each of said plates having a plurality of spaced holes extending therethrough for permitting water to pass therethrough; and
   means of pivotally coupling each of said plates to said inner surface of said housing, wherein said open second end of said housing is inserted in the fishing hole, each of said plates being forced generally perpendicular to said cross support.

8. The ice-skimming device of claim 7, wherein said means of pivotally coupling said at least one pair of plates to said inner surface of said housing comprises at least a pair of arcuate members mounted to said inner surface of said housing and extending through a portion of each of said pair of plates.

9. The ice-skimming device of claim 1, additionally includes:
   a cross support being coupled to and extending between said lip portion such that said cross support extends across said bore of said housing; and
   a filtering assembly being pivotally coupled to said cross support and selectively abuttable against said lip portion and said cross support for filtering out the ice particles from the water.

10. The ice-skimming device of claim 9, wherein said filtering assembly includes:
   at least a pair of plates, each of said plates having first and second opposed surfaces, each of said plates having a plurality of spaced holes extending therethrough for permitting water to pass therethrough; and
   means of pivotally coupling each of said plates to said cross support, wherein said second end of said housing is insertable in the fishing hole, each of said plates being forced generally perpendicular to said cross support.

11. The ice-skimming device of claim 10, wherein said means of pivotally coupling said at least one pair of plates to said cross support comprises a generally annular member mounted to said cross support and extending through a portion of each of said plates.

12. An ice-skimming device for removing ice particles from an ice fishing hole, said device also being adapted for holding at least one fishing pole, said device comprising:
   a housing having a bore for holding the ice particles, said housing having open first and second ends, said housing having a lip portion extending away from an inner surface of said housing defining said bore;
   a handle having first and second ends pivotally coupled to a portion of said housing;
   a filtering assembly being pivotally coupled to said inner surface of said housing and selectively abuttable against said lip portion for filtering out the ice particles from the water; and
   at least one securing member being mounted to said housing, whereby a user may removably position said securing member around the fishing pole in said bore.

13. The ice-skimming device of claim 12, wherein said at least one securing member has first and second ends, said first and second ends being extendable through a pair of spaced holes extending through a peripheral wall of said housing, whereby a user may position said first and second ends of said at least one securing member removably around a portion of the fishing pole.

14. The ice-skimming device of claim 13, wherein said at least one securing member comprises a strip having a hook and loop fastener.

\* \* \* \* \*